(12) United States Patent
Francois et al.

(10) Patent No.: US 10,520,894 B2
(45) Date of Patent: Dec. 31, 2019

(54) WATCHMAKING GASKET

(71) Applicant: The Swatch Group Research and Development Ltd, Marin (CH)

(72) Inventors: Nicolas Francois, Neuchatel (CH); Maria Fernandez Ciurleo, Fleurier (CH); Claire Rannoux, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 124 days.

(21) Appl. No.: 15/725,819

(22) Filed: Oct. 5, 2017

(65) Prior Publication Data

US 2018/0095427 A1 Apr. 5, 2018

(30) Foreign Application Priority Data

Oct. 5, 2016 (EP) .................................... 16192302

(51) Int. Cl.
| | |
|---|---|
| *G04B 39/02* | (2006.01) |
| *C08K 5/54* | (2006.01) |
| *C08K 3/00* | (2018.01) |
| *G04B 19/32* | (2006.01) |
| *G04B 37/08* | (2006.01) |

(52) U.S. Cl.
CPC ............... *G04B 39/02* (2013.01); *C08K 3/00* (2013.01); *C08K 5/54* (2013.01); *G04B 19/32* (2013.01); *G04B 37/08* (2013.01)

(58) Field of Classification Search
CPC ......... G04B 39/02; G04B 19/32; G04B 37/08

USPC ...................................................... 368/227
See application file for complete search history.

(56) References Cited

U.S. PATENT DOCUMENTS

| | | | | |
|---|---|---|---|---|
| 5,519,674 | A  * | 5/1996 | Vollert | B29C 33/005 368/276 |
| 6,226,232 | B1 * | 5/2001 | Ruchonnet | A44C 17/0291 368/223 |
| 8,096,702 | B2 * | 1/2012 | Grotell | G04B 47/044 368/294 |
| 8,500,325 | B2 * | 8/2013 | Ueno | G04B 37/052 368/287 |

FOREIGN PATENT DOCUMENTS

| | | |
|---|---|---|
| EP | 2 363 036 A1 | 9/2011 |
| FR | 2 979 571 A1 | 3/2013 |

OTHER PUBLICATIONS

European Search Report dated Apr. 4, 2017 in European Application 16192302.4, filed on Oct. 5, 2016 ( with English Translation of Categories of Cited Documents).
Sojh | Le Salon Online de la Joaillerie et de l'Horlogerie, http://www.sojh.ch/revue/2009-05-18-le-monde-bouge-les-montres-et-les-marques-aussi, Retrieved Apr. 3, 2017, 2 pages.

* cited by examiner

*Primary Examiner* — Edwin A. Leon
(74) *Attorney, Agent, or Firm* — Oblon, McClelland, Maier & Neustadt, L.L.P.

(57) ABSTRACT

A watchmaking gasket, in particular a watch glass gasket for a timepiece, includes a polymer matrix charged with phosphorescent and/or fluorescent pigments.

16 Claims, 3 Drawing Sheets

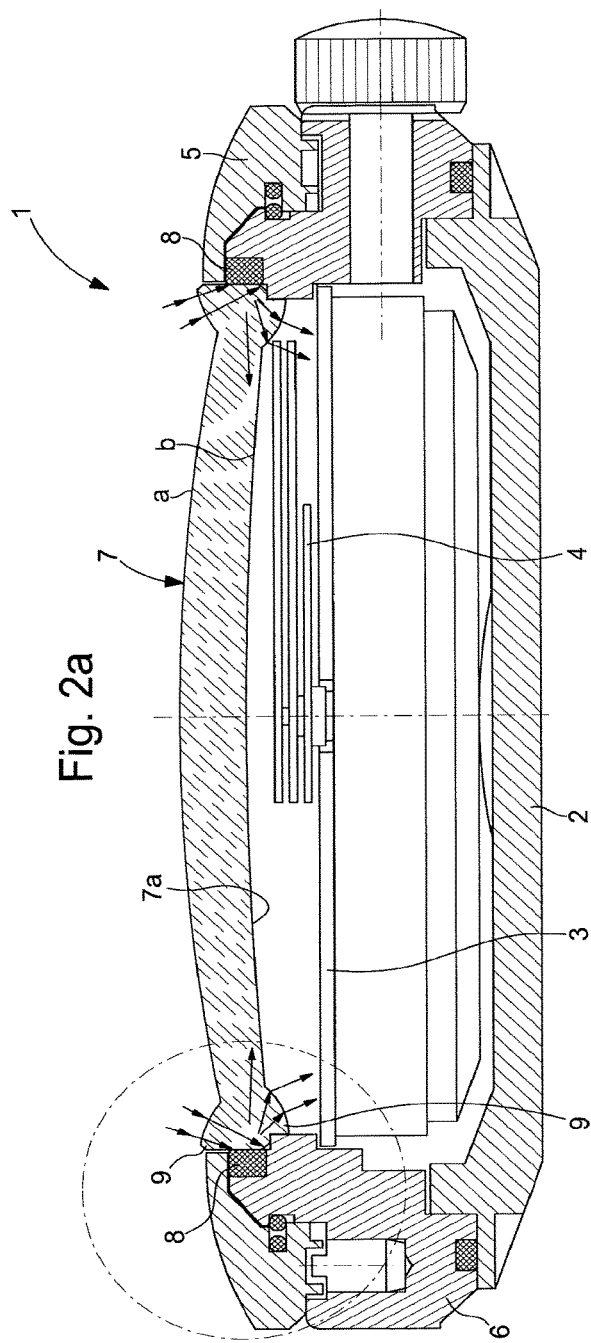
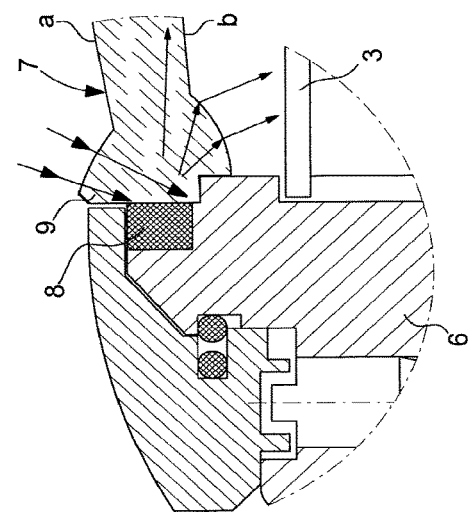
Fig. 2a
Fig. 2b

WATCHMAKING GASKET

This application claims priority from European Patent Application No. 16192302.4 filed on Oct. 5, 2016, the entire disclosure of which is hereby incorporated herein by reference.

SUBJECT OF THE INVENTION

The present invention relates to the field of watchmaking. More specifically, the present invention relates to a gasket used in timepieces and in particular to a phosphorescent and/or fluorescent watch glass gasket, its production process and the timepiece fitted with said gasket.

TECHNOLOGICAL BACKGROUND AND STATE OF THE ART

To make an element visible in the dark, it is known to use luminescent compounds that are charged with light energy before releasing it. Documents EP 2 264 554, EP 2 717 104 and EP 1 837 387 that describe the use of phosphorescent and/or fluorescent compounds can be cited as examples in the watchmaking industry. These can be hands or external elements such as the dial, the bezel, the base or the middle part, which are charged with luminescent particles or covered with a luminescent material. In a variant, the luminescent source can be provided in chip form positioned at different locations in or on the watch case.

To the applicant's knowledge there is no document in the prior art that proposes to use the watch glass gasket, which is arranged between the middle part and the glass and intended to ensure that the watch case is sealed from the outside and, if necessary, to ensure that the glass is fastened to the middle part, as a luminescent source. Hitherto, the tendency has been to the middle part, as a luminescent source. Hitherto, the tendency has been more to keep the watch glass gasket as discrete as possible so as not to spoil the aesthetic appearance and impair the design of the watch.

SUMMARY OF THE INVENTION

The present invention proposes to give a watchmaking gasket, in particular a watch glass gasket, a new illumination functionality. More specifically, the present invention proposes to develop gaskets, in particular phosphorescent and/or fluorescent watch glass gaskets, in order to create a luminous environment enabling in particular information on the dial to be read in the dark.

For this purpose, a gasket, in particular a watch glass gasket, its production process as well as a timepiece according to the attached claims are proposed.

BRIEF DESCRIPTION OF THE FIGURES

The features and advantages of the present invention will become clearer on reading the following detailed description with reference to the following figures.

FIG. 2a shows a sectional view of a variant of the timepiece fitted with a watch glass gasket according to the invention. According to this variant the watch glass is modified to improve the transmission of the light beam towards the dial. FIG. 2b shows an enlarged view of the modified part of the watch glass.

DETAILED DESCRIPTION OF THE INVENTION

Figure 1:
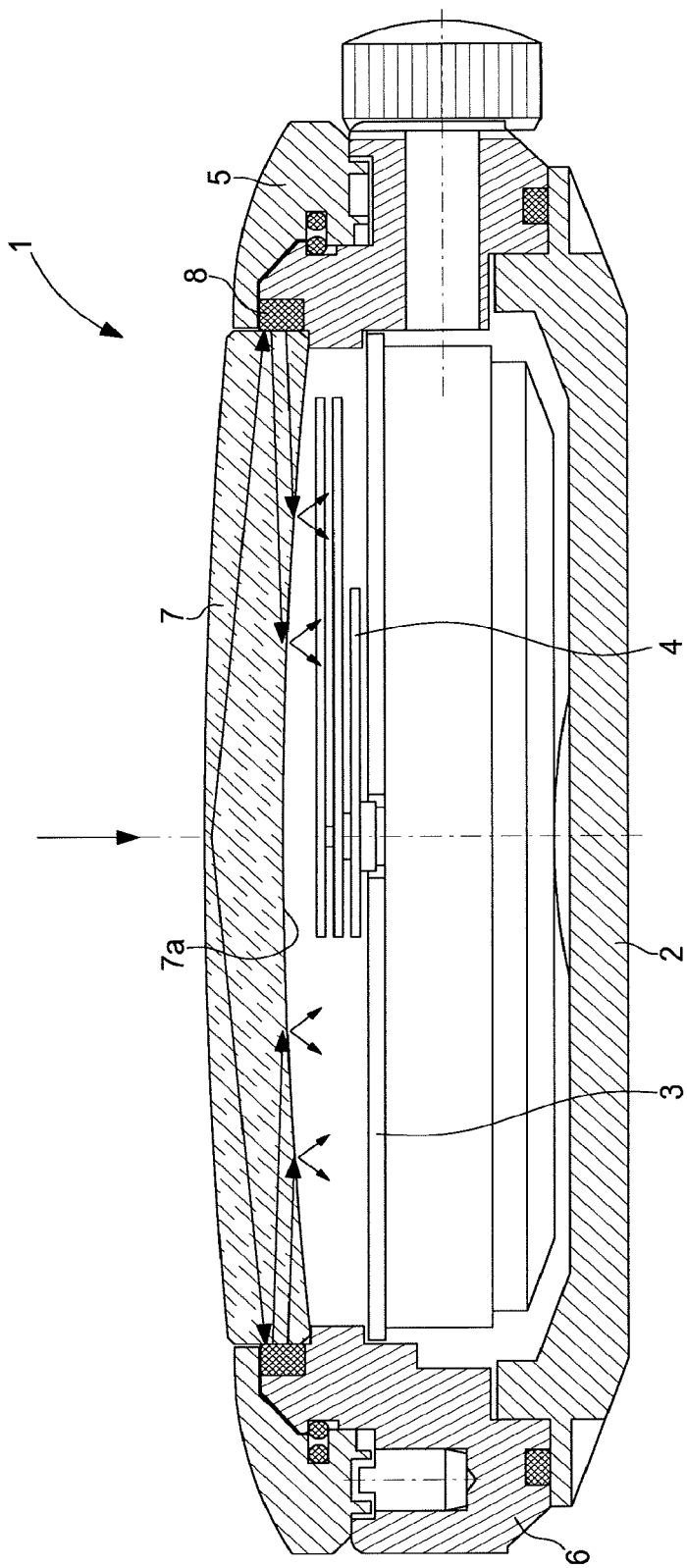
FIG. 1 shows a sectional view of the timepiece fitted with a watch glass gasket according to the invention. The trajectory of the incident light beams emitted by the gasket is shown schematically.

The present invention relates to a phosphorescent and/or fluorescent watchmaking gasket and will be described below in a non-restrictive manner in reference to a use as a phosphorescent watch glass gasket for a watch case, its production process and the timepiece such as a wristwatch fitted with the phosphorescent gasket. In a conventional manner, the timepiece 1 shown in section in FIG. 1 has a base 2, a dial 3, hands 4, a fixed or rotating bezel 5, a middle part 6, a watch glass 7 and a watch glass gasket 8 arranged between the middle part 6 and the watch glass 7 to assure the seal, and in the illustrated embodiment to additionally assure fastening of the watch glass to the middle part. The watch glass gasket has the feature of being luminescent to allow elements of the watch case close to the gasket, and in particular the dial and/or hands, to be illuminated in the dark. In daytime mode the incident light is directed to the luminescent gasket through the watch glass that forms a waveguide between its upper face and its lower face, its light being extracted from the lower face 7a of the watch glass. Once the gasket is charged, it emits a visible light that is diffused in particular towards the dial, as shown schematically in FIG. 1. According to a variant the timepiece does not comprise a bezel or the bezel 5 does not cover the gasket 8, and in this case the incident light also arrives directly on the upper exposed surface of the gasket 8. In the illustrated example the watch glass 7 has a spherical rounded shape, but according to other variants the watch glass 7 can clearly have other shapes, e.g. the watch glass 7 can be flat or have a cylindrical rounded shape.

The watch glass gasket is formed from a polymer matrix charged with phosphorescent pigments. It is made as follows. The material of the gasket is chosen to be able to provide the required properties after preparation with the pigments, i.e.:

Shore hardness: 60-75 Shore D;
resistance to hydrolysis;
sufficiently low permeability to water vapour to prevent condensation phenomena in normal situations of use (shower, hot baths . . . ), but sufficiently high permeability to allow a balance between the exterior and the interior of the watch in reasonable time;
resistance to uv rays to prevent yellowing, discoloration or impairment of the properties of the gasket;
resistance to thermal changes.

For this purpose, the starting material is an elastomer, a thermoplastic or a thermoplastic elastomer selected from the following non-exhaustive list: bi-component polyurethane, silicone, thermoplastic polyurethane, polyamide 12, polyester, photopolymerisable resin. It is mixed with a phosphorescent pigment such as alkaline-earth oxide doped with rare earths. For example, the phosphorescent pigment can be strontium aluminate, strontium silicate, barium silicate or calcium silicate doped with europium or dysprosium. The pigment is present in the form of powders, which by way of example have a particle size distribution such that D90 is less than 40 μm. The phosphorescent pigment is introduced into the starting material with a content in the range of between 1 and 70% by weight, preferably between 2 and 20%, more preferred between 2 and 10% and further preferred between 2 and 5%, to obtain phosphorescence properties without impairing the mechanical and sealing properties of the gasket. A fluorescent pigment or colouring agent can also be used in combination with the phosphorescent pigment to obtain the desired coloured emission. The phosphorescent pigment, and possibly the fluorescent pigment or colouring agent, are introduced during a mixing operation with a functionalised silane hydrophilic coupling agent, e.g. Dynasylan 4148 from Evonik, in order to prevent the formation of agglomerates in the mixture and keep the pigments in dispersion. It will be noted that the coupling agent can be already included in the formulation of the pigments. The gasket can then be prepared in a classic manner by extrusion, injection or casting in a mould.

As an example, a gasket can be prepared from a bicomponent polyurethane A and B with a ratio of A:B of 100:175. Firstly, a mixture of component A with 2% by weight phosphorescent pigments was homogenised and placed in vacuum to degas the mixture. The phosphorescent pigments used were a strontium aluminate doped [with] europium and dysprosium with a particle size in the range of between 5 and 15 μm. Component B was then added to the mixture before a new degassing step. The mixture thus obtained was cast at ambient temperature in a mould that had firstly been impregnated with demoulding agent and was kept in the mould for a minimum of two hours before demoulding and stabilising for 24 h. The material this obtained has a hardness in the range of between 59-63 Shore D and has the sealing properties required for the application.

According to the embodiment of FIG. 1 the gasket can be disposed in a conventional timepiece. However, to improve the transmission of the light waves towards the dial or the zones of interest such as counters or the calendar date aperture or an electro-optical display, it can prove useful to modify some components of the timepiece as follows.

According to a first variant shown in FIGS. 2a and 2b the watch glass is modified so that the incident light is focussed on the phosphorescent gasket. For example, on the periphery of its outside face (a) the watch glass 7 is fitted with a converging lens 9 to allow the beam of incident light to centre on the gasket 8. So as not to interfere with the reading of the dial, the lens is arranged on the periphery of the watch glass forming a ring extending over a maximum distance of 10 mm, or even 5 mm. Optionally, the watch glass 7 can be fitted with a converging or Fresnel-type lens 9 on its inside face (b) to allow the light beam emitted by the gasket 8 to focus on the desired indications of the dial 3. In both cases the lens can be machined into the watch glass or attached by gluing. Obviously in the case where the watch glass is formed by moulding the lens can be made from the same material as the production material of the watch glass.

Figure 3A:
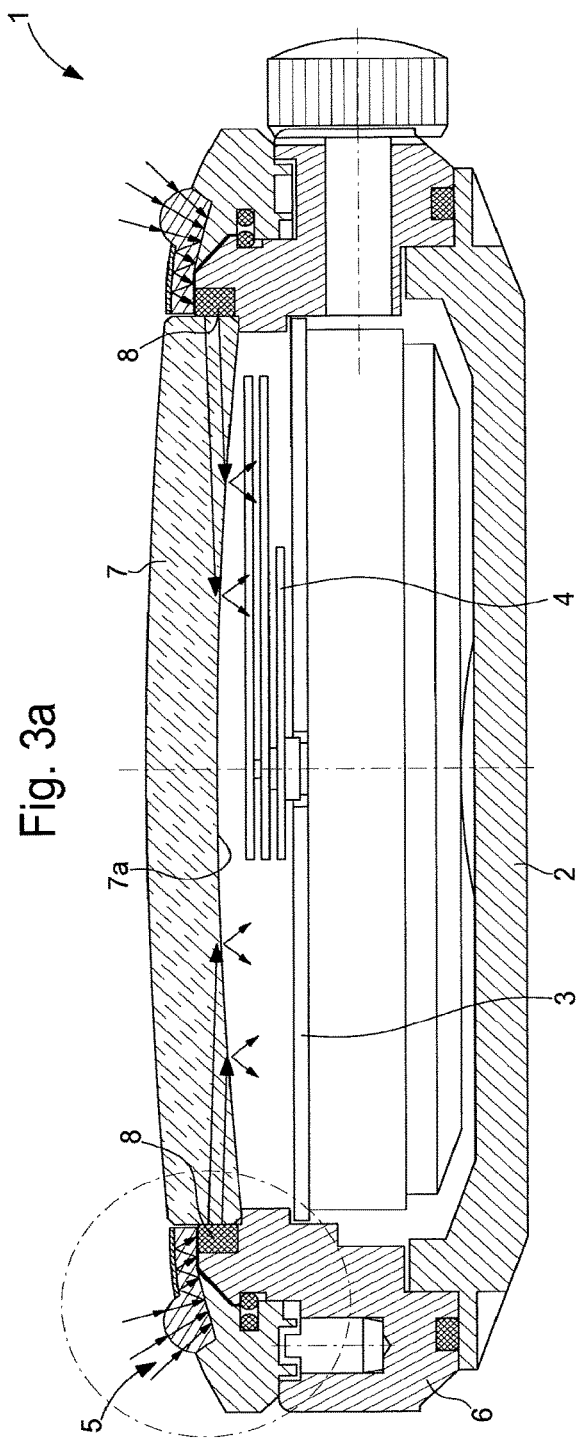
FIG. 3a shows a sectional view of another variant of the timepiece fitted with a watch glass gasket according to the invention. According to this other variant the bezel is modified to improve the transmission of the light beam towards the dial.
Figure 3B:
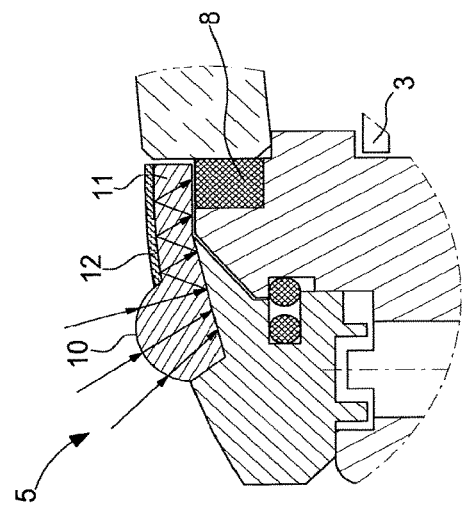
FIG. 3b shows an enlarged view of the modified part of the bezel.

According to a second variant shown in FIGS. 3a and 3b it is the bezel 5 that is modified to ensure optimum reception of the ambient light by the gasket 8. On its outside face it has a Fresnel lens type transfer dome 10 focussing and directing the incident light towards the portion 11 of the bezel acting as waveguide up to the gasket 8. This portion 11 is provided on its outside face with a layer that is reflective or has a refractive index slightly lower than the portion 11 that is reflective or refracts the light within the waveguide. According to this embodiment the bezel is made from a material that is transparent to the wavelengths necessary for exciting the phosphorescent pigments except for the layer 12 that is reflective or has a refractive index slightly lower than the portion 11. This layer 12 can be a metallised layer, for example. To focus the light beam emitted by the gasket on particular locations of the dial, it is also conceivable to modify the inside face of the watch glass, as shown in FIG. 2.

According to a third variant the components of the watch case such as the bezel and the middle part are made from a transparent material having a light transmission factor of at least 80%. For example, the material can be polymethyl methacrylate (PMMA), amorphous polyamide, polycarbonate, methyl methacrylate acrylonitrile butadiene styrene (MABS), glass, sapphire etc.

It will be noted that the present invention does not exclude combining the abovementioned variants and that other watchmaking gaskets can benefit from this phosphorescence and/or fluorescence: for example, for SAV (presence or absence of gasket) or also for assembly operations in order to distinguish the type of gasket to attach, particularly if they are transparent, of similar dimensions, but with different mechanical properties.

It is also conceivable according to a variant of the invention to only have fluorescent pigments or colouring agents in the polymer matrix, wherein these fluorescent pigments can illuminate a zone of the watch with a particular colour when they are subjected to a stimulating light for purely aesthetic effects. As an example, these fluorescent pigments or colouring agents, which are present in the matrix in the same proportions as those mentioned above in association with the phosphorescent pigments, can be chosen from the group consisting of fluorescein, naphthyl, anthracene, coumarin, rhodamine, fluorobenzoate.

It could also be provided in another variant that the gasket comprises a polymer matrix charged with a mixture of phosphorescent and fluorescent pigments to combine the abovementioned effects.

The gasket that has just been described can serve not only for fixture of the watch glass to the middle part, but also to form the seal of such a watch glass. The gasket can also serve to seal other elements of a timepiece such as a control staff or a pushbutton.

LEGEND (1) timepiece
(2) base
(3) dial
(4) hands
(5) bezel
(6) middle part
(7) watch glass
(a) outside face
(b) inside face
(8) watch glass gasket
(9) lens, and more specifically converging lens or Fresnel type lens
(10) transfer dome of the bezel
(11) portion of the bezel acting as waveguide
(12) diffusing layer

What is claimed is:
1. A timepiece comprising:
a middle part;
a watch glass disposed in a seat of the middle part;
a bezel positioned radially outside of the watch glass; and
a watch glass gasket interposed between the middle part and the watch glass to form a seal, wherein the gasket comprises a polymer matrix charged with phosphorescent and/or fluorescent pigments.

2. The timepiece according to claim 1, wherein the polymer matrix contains between 1 and 70% by weight phosphorescent and/or fluorescent pigments.

3. The timepiece according to claim 1, wherein the phosphorescent pigments are alkaline earth oxide doped with rare earths.

4. The timepiece according to claim 1, wherein the polymer matrix comprises a mixture of phosphorescent pigments and fluorescent pigments.

5. The timepiece according to claim 1, wherein the polymer matrix is made from an elastomeric, thermoplastic or thermoplastic elastomer material.

6. The timepiece according to claim 1, wherein the polymer matrix contains a bicomponent polyurethane, silicone, thermoplastic polyurethane, polyamide, polyester, photopolymerisable resin.

7. The timepiece according to claim 1, wherein the fluorescent pigments are selected from a group consisting of fluorescein, naphthyl, anthracene, coumarin, rhodamine, and fluorobenzoate.

8. The timepiece according to claim 1, wherein, on the periphery of an outside face of the watch glass that is outside the timepiece, the watch glass has a converging lens extending outward from a central portion of the outside face.

9. The timepiece according to claim 1, wherein, on the periphery of an inner face of the watch glass that is inside the timepiece, the watch glass has a converging or Fresnel type lens extending inward from a central portion of the inner face.

10. The timepiece according to claim 8, wherein the lens occupies an annular space with a thickness less than 10 mm and preferably less than 5 mm.

11. The timepiece according to claim 1, wherein on an outer face outside the timepiece the bezel has a dome transparent to wavelengths suitable for exciting the pigments allowing the light to be focused and directed towards a portion of the bezel acting as waveguide up to the watch glass gasket, wherein on the outside face said portion has a layer that is reflective or has a refractive index that is slightly lower than the portion to reflect the light within the bezel.

12. The timepiece according to claim 8, wherein the bezel and the middle part are completely or partly made from a material that is transparent to wavelengths suitable for exciting the pigments.

13. The timepiece according to claim 1, wherein the polymer matrix contains between 2 and 20% by weight phosphorescent and/or fluorescent pigments.

14. The timepiece according to claim 1, wherein the polymer matrix contains between 2 and 10% by weight phosphorescent and/or fluorescent pigments.

15. The timepiece according to claim 1, wherein the polymer matrix contains between 2 and 5% by weight phosphorescent and/or fluorescent pigments.

16. The timepiece according to claim 1, wherein the watch glass gasket is positioned beneath the bezel.

* * * * *